United States Patent
Wang et al.

(10) Patent No.: US 10,477,606 B2
(45) Date of Patent: *Nov. 12, 2019

(54) DOWNLINK-ONLY FIFTH GENERATION NEW RADIO

(71) Applicant: Google LLC, Mountain View, CA (US)

(72) Inventors: Jibing Wang, San Jose, CA (US); Erik Stauffer, Sunnyvale, CA (US); Aamir Akram, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,541

(22) Filed: Mar. 20, 2019

(65) Prior Publication Data
US 2019/0223243 A1 Jul. 18, 2019

Related U.S. Application Data

(63) Continuation of application No. 15/694,269, filed on Sep. 1, 2017, now Pat. No. 10,278,227.

(51) Int. Cl.
*H04W 4/00* (2018.01)
*H04W 76/15* (2018.01)
(Continued)

(52) U.S. Cl.
CPC ........... *H04W 76/15* (2018.02); *H04W 76/00* (2013.01); *H04B 7/0413* (2013.01);
(Continued)

(58) Field of Classification Search
CPC ..... H04W 76/15; H04W 76/00; H04W 16/28; H04W 84/042; H04B 17/318; H04B 7/0413; H04B 7/0634
(Continued)

(56) References Cited

U.S. PATENT DOCUMENTS 8,184,585 B2   5/2012  Choi et al.
8,699,618 B2   4/2014  Park et al.
(Continued)

FOREIGN PATENT DOCUMENTS

EP   2250841   11/2010
EP   3193553    7/2017
(Continued)

OTHER PUBLICATIONS

"Final Office Action", U.S. Appl. No. 15/798,251, dated Mar. 18, 2019, 23 pages.
(Continued)

*Primary Examiner* — Huy C Ho
(74) *Attorney, Agent, or Firm* — Colby Nipper PLLC (57) ABSTRACT

In aspects of downlink-only fifth generation new radio, a mobile communication device includes a radio frequency transceiver, a radio frequency receiver, and a processor and memory system to implement a radio control manager application that establishes an LTE anchor link with a base station using the LTE transceiver, establishes a 5G NR downlink from the base station to the mobile communication device using the radio frequency receiver, and manages the 5G NR downlink via an uplink of the LTE anchor link. In another aspect, a mobile communication device estimates channel conditions for a 5G NR downlink, selects a precoding matrix to beamform the 5G NR downlink, and provides an indication of the selected precoding matrix via the LTE anchor link.

28 Claims, 8 Drawing Sheets

(51) Int. Cl.

| | | |
|---|---|---|
| *H04W 76/00* | (2018.01) | |
| *H04B 17/318* | (2015.01) | |
| *H04B 7/0413* | (2017.01) | |
| *H04B 7/06* | (2006.01) | |
| *H04W 16/28* | (2009.01) | |
| *H04W 84/04* | (2009.01) | |

(52) U.S. Cl.
CPC .......... *H04B 7/0634* (2013.01); *H04B 17/318* (2015.01); *H04W 16/28* (2013.01); *H04W 84/042* (2013.01)

(58) Field of Classification Search
USPC ........................................................ 370/328
See application file for complete search history.

(56) References Cited

U.S. PATENT DOCUMENTS

| | | | |
|---|---|---|---|
| 9,060,313 | B2 | 6/2015 | He et al. |
| 9,236,982 | B2 | 1/2016 | Li et al. |
| 10,278,227 | B2 | 4/2019 | Wang et al. |
| 2004/0219919 | A1 | 11/2004 | Whinnett et al. |
| 2005/0245258 | A1 | 11/2005 | Classon et al. |
| 2008/0161033 | A1 | 7/2008 | Borran et al. |
| 2008/0310395 | A1 | 12/2008 | Kashima |
| 2009/0207793 | A1 | 8/2009 | Shen et al. |
| 2010/0195614 | A1 | 8/2010 | Nimbalker et al. |
| 2010/0322090 | A1 | 12/2010 | Zhang et al. |
| 2011/0249578 | A1 | 10/2011 | Nazar et al. |
| 2013/0163532 | A1 | 6/2013 | Anderson et al. |
| 2013/0287000 | A1 | 10/2013 | Zhu et al. |
| 2013/0294273 | A1 | 11/2013 | Lunttila et al. |
| 2014/0016596 | A1 | 1/2014 | Kim et al. |
| 2014/0098781 | A1 | 4/2014 | Vos et al. |
| 2014/0098782 | A1 | 4/2014 | Shirazi et al. |
| 2014/0153536 | A1 | 6/2014 | Ouchi et al. |
| 2015/0043458 | A1 | 2/2015 | Seo et al. |
| 2015/0156764 | A1 | 6/2015 | Yang et al. |
| 2016/0150462 | A1 | 5/2016 | Yang et al. |
| 2016/0366669 | A1 | 12/2016 | Yum et al. |
| 2017/0048825 | A1 | 2/2017 | Itagaki et al. |
| 2017/0134080 | A1 | 5/2017 | Rahman et al. |
| 2017/0230869 | A1 | 8/2017 | Kubota et al. |
| 2017/0230979 | A1 | 8/2017 | Saxena et al. |
| 2017/0257774 | A1 | 9/2017 | Ghosh et al. |
| 2017/0311326 | A1 | 10/2017 | Wong et al. |
| 2017/0374704 | A1 | 12/2017 | Sharma et al. |
| 2018/0049214 | A1 | 2/2018 | Kubota et al. |
| 2018/0124785 | A1 | 5/2018 | Taylor et al. |
| 2018/0146404 | A1 | 5/2018 | Zhang et al. |
| 2018/0199269 | A1* | 7/2018 | Nammi ................. H04W 48/12 |
| 2018/0227960 | A1* | 8/2018 | Belghoul .............. H04L 1/1854 |
| 2019/0075604 | A1 | 3/2019 | Wang et al. |
| 2019/0132831 | A1 | 5/2019 | Stauffer et al. |
| 2019/0159273 | A1* | 5/2019 | Shi ........................ H04W 76/12 |

FOREIGN PATENT DOCUMENTS

| | | |
|---|---|---|
| WO | 2017101046 | 6/2017 |
| WO | 2017111987 | 6/2017 |
| WO | 2018128895 | 7/2018 |

OTHER PUBLICATIONS

"International Search Report and Written Opinion", PCT Application No. PCT/US2018/057503, dated Jan. 24, 2019, 16 pages.

"International Search Report and Written Opinion", PCT Application No. PCT/US2018/048628, dated Nov. 27, 2018, 51 pages.

"Notice of Allowance", U.S. Appl. No. 15/694,269, dated Dec. 18, 2018, 20 pages.

"Pre-Interview Communication", U.S. Appl. No. 15/694,269, dated Oct. 2, 2018, 3 pages.

"Pre-Interview Communication", U.S. Appl. No. 15/798,251, dated Nov. 30, 2018, 4 pages.

"Views on Single UL Transmission and UL Sharing", 3GPP TSG RAN WG1 NR Ad-Hoc#2, Qingdao, P.R. China Jun. 27-30, 2017, Jun. 2017, 5 pages.

"WF on UL Sharing for NSA NR UE", 3GPP TSG RAN WG1 #89 Meeting, Hangzhou, P.R. China, May 15-19, 2017, May 2017, 6 pages.

Damnjanovic, et al., "A Survey on 3GPP Heterogeneous Networks", IEEE Wireless Communications, Jun. 2011, 12 pages.

* cited by examiner

DOWNLINK-ONLY FIFTH GENERATION NEW RADIO

RELATED APPLICATION

This Application is a continuation application claiming priority under 35 U.S.C. § 120 to U.S. patent application Ser. No. 15/694,269, filed Sep. 1, 2017, the disclosure of which is incorporated by reference herein in its entirety.

BACKGROUND

The evolution of wireless communication to fifth generation (5G) standards and technologies provides higher data rates and greater capacity, with improved reliability and lower latency, which enhances mobile broadband services. 5G technologies also provide new classes of services for vehicular, fixed wireless broadband, and the Internet of Things (IoT).

A unified air interface, which utilizes licensed, unlicensed, and shared license radio spectrum, in multiple frequency bands, is one aspect of enabling the capabilities of 5G systems. The 5G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband.

To increase the capacity of 5G radio networks, Multiple Input Multiple Output (MIMO) antenna systems are used to beamform signals transmitted between base stations and user terminals. In 5G networks, a large number of MIMO antennas (e.g., hundreds of antennas) are employed for beamforming signals, which is often referred to as Massive MIMO, to provide beamformed transmission and reception that is focused on small areas of space around individual user terminals. Massive MIMO beamforming improves network throughput, energy efficiency, and interference rejection. Massive MIMO systems use a channel estimate of the radio frequency (RF) channel characteristics between the base station and the user terminal to determine beamforming coefficients for transmission and reception.

The specification of the features in the 5G air interface for user equipment (UE) is defined as 5G New Radio (5G NR). The combination of supporting multiple frequency bands, wider channel bandwidths, higher data rates, and Massive MIMO increases the number of uplink and downlink processing chains, power amplifiers, and RF front end components required in the UE. For user equipment such as a smartphone, the support of 5G NR features for both uplink and downlink communication increases power consumption that reduces the battery life of the smartphone, increases the complexity of managing in-device coexistence problems related to interference during simultaneous operation of Long Term Evolution (LTE) and 5G transmitters, and requires additional components that occupy more space in the constrained mechanical package of the smartphone, as well as increasing the cost of the smartphone.

SUMMARY

This summary is provided to introduce simplified concepts of downlink-only fifth generation new radio. The simplified concepts are further described below in the Detailed Description. This summary is not intended to identify essential features of the claimed subject matter, nor is it intended for use in determining the scope of the claimed subject matter.

In some aspects, a mobile communication device includes a radio frequency transceiver, a radio frequency receiver, and a processor and memory system to implement a radio control manager application that establishes an LTE anchor link with a base station using the LTE transceiver, establishes a 5G NR downlink from the base station to the mobile communication device using the radio frequency receiver, and manages the 5G NR downlink via an uplink of the LTE anchor link.

In another aspect, a method of managing a fifth generation new radio (5G NR) downlink from a base station is described, in which a user equipment (UE) establishes a Long Term Evolution (LTE) anchor link with the base station, establishes the fifth generation new radio (5G NR) downlink from the base station to the UE, and manages the 5G NR downlink via an uplink of the LTE anchor link.

In a further aspect, a system includes an Evolved Universal Terrestrial Radio Access Network Node B (E-UTRAN Node B) and a user equipment (UE) that is configured to establish a Long Term Evolution (LTE) anchor link with the E-UTRAN Node B, establish a fifth generation new radio (5G NR) downlink from the E-UTRAN Node B to the user equipment, and manage the 5G NR downlink via an uplink of the LTE anchor link.

BRIEF DESCRIPTION OF THE DRAWINGS

Aspects of downlink-only fifth generation new radio are described with reference to the following drawings. The same numbers are used throughout the drawings to reference like features and components.

DETAILED DESCRIPTION

As wireless communication systems evolve to 5G NR technologies, 5G networks will be deployed in parallel with existing Long Term Evolution (LTE) networks. Both operator networks and user devices will simultaneously support the use and interoperation of LTE and 5G NR technologies. Initial deployments of 5G NR will be focused on data applications, such as video streaming to user equipment, with other services, such as voice calling, coming later. In these initial deployments, LTE will provide the other services and provide coverage in areas without 5G NR coverage. An anchor link is established using LTE between a base station and a user terminal. A 5G NR link can be established between the base station, or another base station in the network, and the user terminal using signaling over the LTE anchor link.

Many data applications that can take advantage of higher 5G NR data rates, especially data rates in the mmWave bands, are asymmetric in the amount of data transferred over the uplink as compared to the downlink. For example, video streaming or web downloads transfer a large amount of data over the downlink, but a relatively small amount of data (e.g., acknowledgements, flow control, Uniform Resource Locators, and the like) over the uplink. In another example, wider 5G NR bandwidths enable fast downloads of video content that are cached on a user device for later consumption by the user. The combination of supporting multiple frequency bands, wider channel bandwidths, higher data rates, and Massive MIMO increases the number of uplink and downlink processing chains, power amplifiers, and RF front end components required in user equipment. Yet for these applications, the resources that provide 5G NR uplink capacity in the user equipment are underutilized as the uplink data throughput for these applications does not require the capacity the 5G NR uplink provides.

In aspects, the LTE anchor uplink can be used for uplink communication associated with applications using the 5G NR downlink. The data capacity and latency of the LTE anchor uplink is sufficient to support data applications using the 5G NR downlink. Using the LTE anchor uplink, for signaling and uplink communication related to the 5G NR downlink, can eliminate the need to provide support 5G NR uplink in user equipment. This use of downlink-only 5G NR communication eliminates the need for the user equipment to support a 5G NR uplink with its associated transmitter processing chains and transmit power amplifiers. Downlink-only 5G NR reduces components in the user equipment, reduces the complexity of managing in-device coexistence problems, reduces power consumption in the user equipment, and requires less space in the user equipment, while providing the high throughput data downlink experience a user expects.

In aspects, the user equipment provides feedback to the base station for beamforming of the 5G NR downlink via the LTE anchor uplink. For example, beamforming for Massive MIMO uses closed-loop or beam-index beamforming for downlink-only 5G NR. The base station and the user equipment both have a copy of a codebook that includes precoding matrices for beamforming with an index value (e.g., a precoding matrix indicator or PMI) associated with each precoding matrix in the codebook. The base station transmits cell-specific reference signals (RS) distributed over various resource elements (RE) and/or timeslots of the 5G NR downlink. The reference signals are evaluated by the user equipment to estimate channel conditions between the base station and the user equipment. Based on the channel estimates, the user equipment selects a precoding matrix to use for beamforming and sends a response, which includes the PMI of the selected precoding matrix, via the LTE anchor uplink, to the base station. The base station uses the selected precoding matrix to beamform the 5G NR downlink to the user equipment. Providing beamforming indices for downlink-only 5G NR via the LTE anchor link reduces components, power consumption, and required space in the user equipment, while providing beamforming for improving data throughput and interference rejection to user equipment.

In aspects, the user equipment provides application and network layer feedback messages over the LTE anchor uplink for data transferred to the UE via the 5G NR downlink. For example, an acknowledgement (ACK) and/or a negative acknowledgement (NACK) is provided by applications and/or network layers in the user equipment to corresponding applications and/or network layers at the base station, within the core network, or at a remote service. For data transfers over the 5G NR downlink, the ACK or NACK is transmitted via the LTE anchor uplink. By way of further example, for TCP transfers over the 5G NR downlink, the TCP flow control packets are transmitted via the LTE anchor uplink. Providing application and network layer feedback for downlink-only 5G NR via the LTE anchor link reduces components, power consumption, and required space in the user equipment, while providing application and networking control and response messages to support internet-connected communication services.

In aspects, signaling for activation and deactivation, communication of grant information, 5G NR downlink measurements, and/or channel quality measurements are communicated between the base station and the user equipment over the LTE anchor link. For example, Radio Resource Control (RRC) messages and/or Media Access Control (MAC) control elements (CE) to activate or deactivate the 5G NR downlink are communicated between the base station and the user equipment over the LTE anchor link. In addition to communicating 5G NR activation messages over the LTE anchor link, the base station can also communicate activation and/or deactivation messages for the 5G NR downlink over the 5G NR downlink, and/or communicate activation and/or deactivation messages for the LTE anchor link over the 5G NR downlink.

In another example, resource elements (RE) that grant time and frequency resources to the user equipment for the 5G NR downlink are transmitted from the base station to the user equipment over the LTE anchor downlink. The base station can also communicate grant information for the LTE anchor link via the 5G NR downlink to the user equipment.

In a further example, measurements of the 5G NR link that are used for mobility management, such as Received Signal Strength Indicator (RSSI), Reference Signal Received Power (RSRP), and/or Reference Signal Received Quality (RSRQ), or for modulation and coding scheme (MCS) control, such as the channel quality indicator (CQI), are transmitted to the base station over the LTE anchor uplink. Providing activation and deactivation, communication of grant information, 5G NR downlink measurements, and/or channel quality measurements for downlink-only 5G NR reduces components in the user equipment, reduces components, power consumption, and required space in the user equipment, while providing application and networking control and response messages to support internet-connected communication services.

While features and concepts of the described systems and methods for downlink-only fifth generation new radio can be implemented in any number of different environments, systems, devices, and/or various configurations, aspects of downlink-only fifth generation new radio are described in the context of the following example devices, systems, and configurations.

Figure 1:
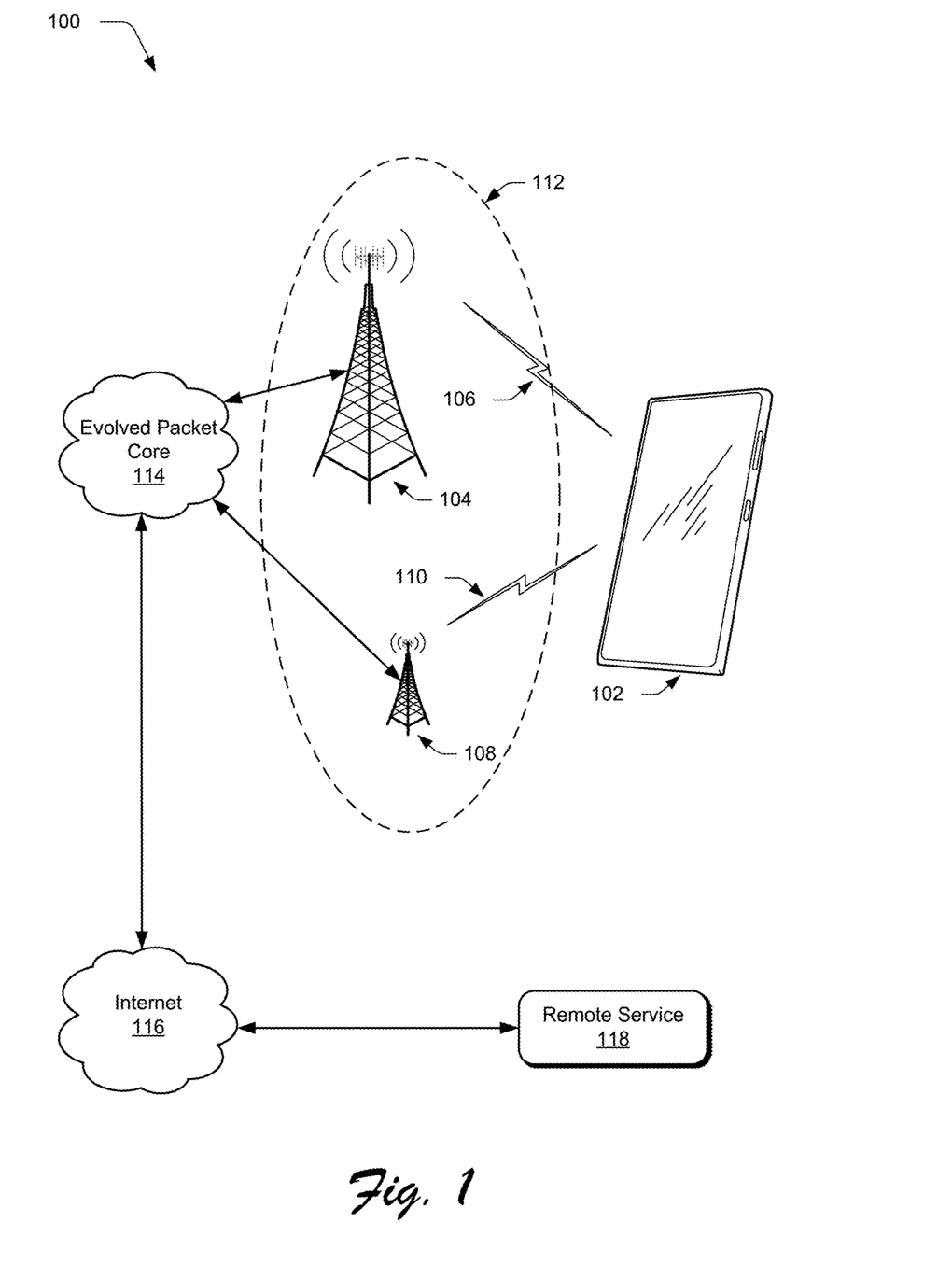
FIG. 1 illustrates an example wireless network system in which various aspects of downlink-only fifth generation new radio can be implemented.

FIG. 1 illustrates an example environment 100 which includes a user equipment 102 that communicates with a base station 104 through a wireless communication link 106 (wireless link 106). In this example, the user equipment 102 is implemented as a smartphone. Although illustrated as a smartphone, the user equipment 102 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base station 104 (e.g., an Evolved Universal Terrestrial Radio Access Network Node B, E-UTRAN Node B, evolved Node B, eNodeB, eNB, and the like) may be implemented in a macrocell, microcell, small cell, picocell, and the like, or any combination thereof.

The base station 104 communicates with the user equipment 102 via the wireless link 106, which may be implemented as any suitable type of wireless link. The wireless link 106 can include a downlink of data and control information communicated from the base station 104 to the user equipment 102 and/or an uplink of other data and control information communicated from the user equipment 102 to the base station 104. The wireless link 106 may include one or more wireless links or bearers implemented using any suitable communication protocol or standard, or combination of communication protocols or standards such as 3rd Generation Partnership Project Long-Term Evolution (3GPP LTE), 5G NR, and so forth. In aspects, the wireless link 106 includes an LTE anchor link and a 5G NR downlink.

Alternatively and/or optionally, the wireless link 106 includes an LTE uplink and a 5G NR downlink without an LTE downlink, or the wireless link 106 includes an LTE downlink and a 5G NR uplink without an LTE uplink and/or a 5G NR downlink. These configuration are useful to eliminate or repurpose processing chains in the user equipment 102 or to provide operational flexibility based on variations in wireless network coverage. The techniques described herein apply equally to these alternate and/or optional configurations.

In aspects, the user equipment 102 communicates with an additional base station 108 via a wireless link 110. The wireless link 110 may be implemented using the same communication protocol or standard, or a different communication protocol or standard, than the wireless link 106. For example, the wireless link 106 is an LTE link and the wireless link 110 is a 5G NR link. The base station 104, the base station 108, and any additional base stations (not illustrated for clarity) are collectively a Radio Access Network 112 (RAN 112, Evolved Universal Terrestrial Radio Access Network 112, E-UTRAN 112), which are connected via an Evolved Packet Core 114 (EPC 114) network to form a wireless operator network. For example, the base station 104 may be an LTE macrocell and the base station 108 may be a 5G NR small cell both in communication with the user equipment 102, the communication being coordinated within and/or via the EPC 114. The UE 102 may connect, via the EPC 114, to public networks, such as the Internet 116 to interact with a remote service 118.

Figure 2:
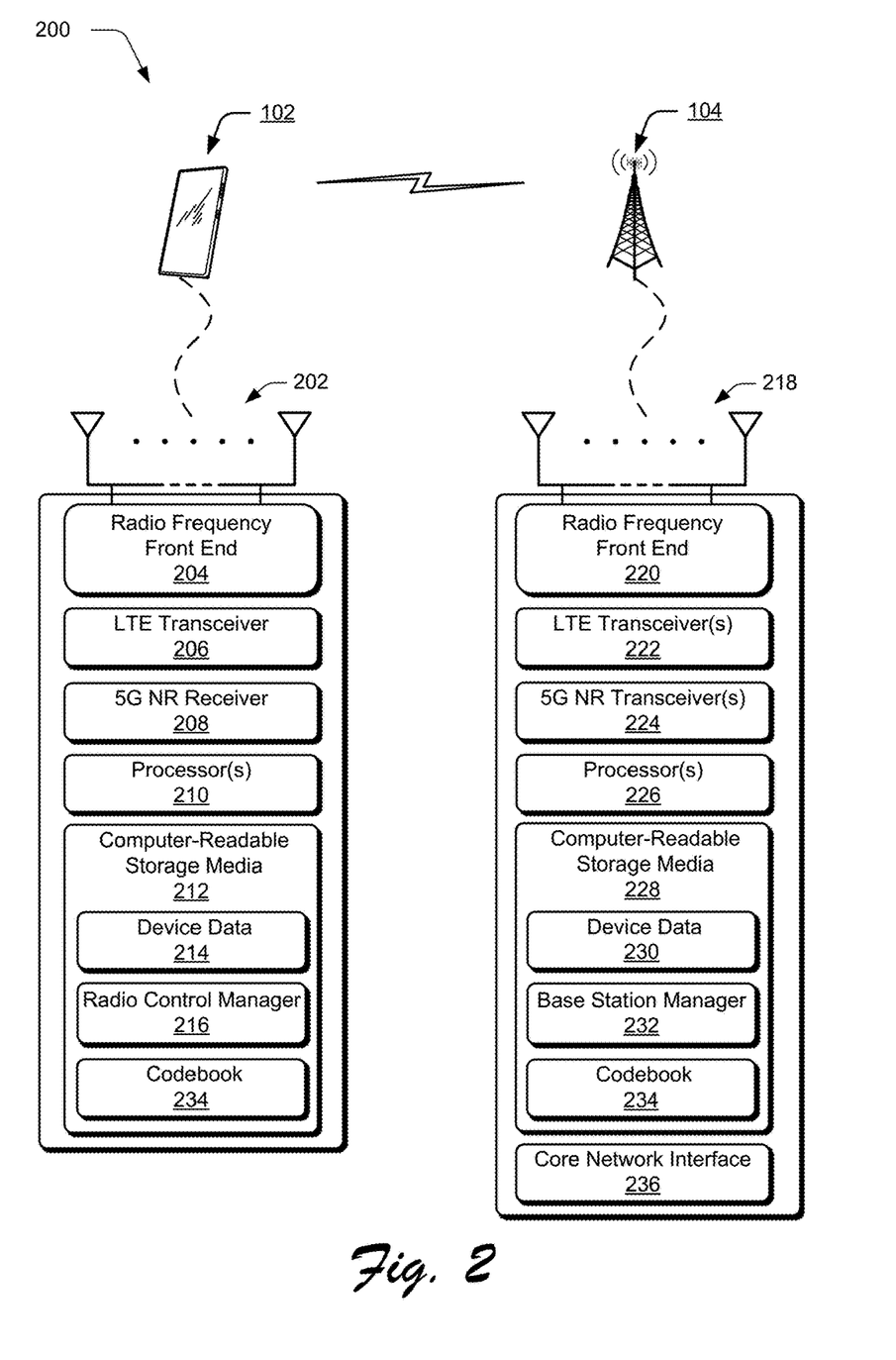
FIG. 2 illustrates an example device diagram that can implement various aspects of downlink-only fifth generation new radio.

FIG. 2 illustrates an example device diagram 200 of the user equipment 102 and the base station 104. It should be noted that only the essential features of the user equipment 102 and the base station 104 are illustrated here for the sake of clarity. The user equipment 102 includes antennas 202, a radio frequency front end 204 (RF front end 204), an LTE transceiver 206, and a 5G NR receiver 208 for communicating with base stations 104 in the E-UTRAN 112. The RF front end 204 of the user equipment 102 can couple or connect the LTE transceiver 206, and the 5G NR receiver 208 to the antennas 202 to facilitate various types of wireless communication. The antennas 202 of the user equipment 102 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR receiver 208. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards. Alternatively, the 5G NR receiver 208 may be replaced with a 5G NR transceiver and operations describe herein as performed by the 5G NR receiver 208 may performed by the 5G NR transceiver.

The user equipment 102 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useful to store device data 214 of the user equipment 102. The device data 214 includes user data, multimedia data, applications, and/or an operating system of the user equipment 102, which are executable by processor(s) 210 to enable user interaction with the user equipment 102.

CRM 212 also includes a radio control manager 216, which, in one implementation, is embodied on CRM 212 (as shown). Alternately or additionally, the radio control manager 216 may be implemented in whole or part as hardware logic or circuitry integrated with or separate from other components of the user terminal 102. In at least some aspects, the radio control manager 216 configures the RF front end 204, the LTE transceiver 206, and/or the 5G NR receiver 208 to implement the techniques for downlink-only fifth generation new radio described herein.

Turning to the device diagram for the base station 104, the base station 104 shown in FIG. 2 includes a single network node (e.g. an E-UTRAN Node B). The functionality of the base station 104 may be distributed across multiple network nodes and/or devices, and distributed in any fashion suitable to perform the functions described herein. The base station 104 includes antennas 218, a radio frequency front end 220 (RF front end 220), one or more LTE transceivers 222, and one or more 5G NR transceivers 224 for communicating with the user equipment 102. The RF front end 220 of the base station 104 can couple or connect the LTE transceivers 222 and the 5G NR transceivers 224 to the antennas 218 to facilitate various types of wireless communication. The antennas 218 of the base station 104 may include an array of multiple antennas that are configured similar to or differently from each other. The antennas 218 and the RF front end 220 can be tuned to, and/or be tunable to, one or more frequency band defined by the 3GPP LTE and 5G NR communication standards, and implemented by the LTE transceivers 222, and/or the 5G NR transceivers 224. Additionally the antennas 218, the RF front end 220, the LTE transceivers 222, and/or the 5G NR transceivers 224 may be configured to support beamforming, such as Massive-MIMO, for the transmission and reception of communications with the user equipment 102.

The base station 104 also includes processor(s) 226 and computer-readable storage media 228 (CRM 228). The processor 226 may be a single core processor or a multiple core processor composed of a variety of materials, such as silicon, polysilicon, high-K dielectric, copper, and so on. CRM 228 may include any suitable memory or storage device such as random-access memory (RAM), static RAM (SRAM), dynamic RAM (DRAM), non-volatile RAM (NVRAM), read-only memory (ROM), or Flash memory useful to store device data 230 of the base station 104. The device data 230 includes network scheduling data, radio resource management data, applications, and/or an operating system of the base station 104, which are executable by processor(s) 226 to enable communication with the user equipment 102.

CRM 228 also includes a base station manager 232, which, in one implementation, is embodied on CRM 228 (as shown). Alternately or additionally, the base station manager 232 may be implemented in whole or part as hardware logic or circuitry integrated with or separate from other components of the base station 104. In at least some aspects, the base station manager 232 configures the LTE transceivers 222 and the 5G NR transceivers 224 for communication with the user equipment 102, as well as communication with the EPC 114. The base station 104 includes a core network interface 236 that connects the base station 104 to the services implemented in the EPC 114 and/or to other base stations 104 to exchange data and control information to manage the communication of various base stations 104 with the user equipment 102.

Closed-Loop Beamforming Feedback

In aspects, the user equipment 102 provides feedback to the base station 104 for beamforming of the 5G NR downlink via the LTE anchor link. For example, beamforming for Massive MIMO uses closed-loop or beam-index beamforming for downlink-only 5G NR. The base station 104 and the user equipment 102 both have a copy of a codebook 234 that includes precoding matrices for beamforming with an index value (e.g., a precoding matrix indicator or PMI) associated with each precoding matrix. The codebook 234 can be stored in the CRM 212 of the user equipment 102 and in the CRM 228 of the base station 104.

Figure 3:
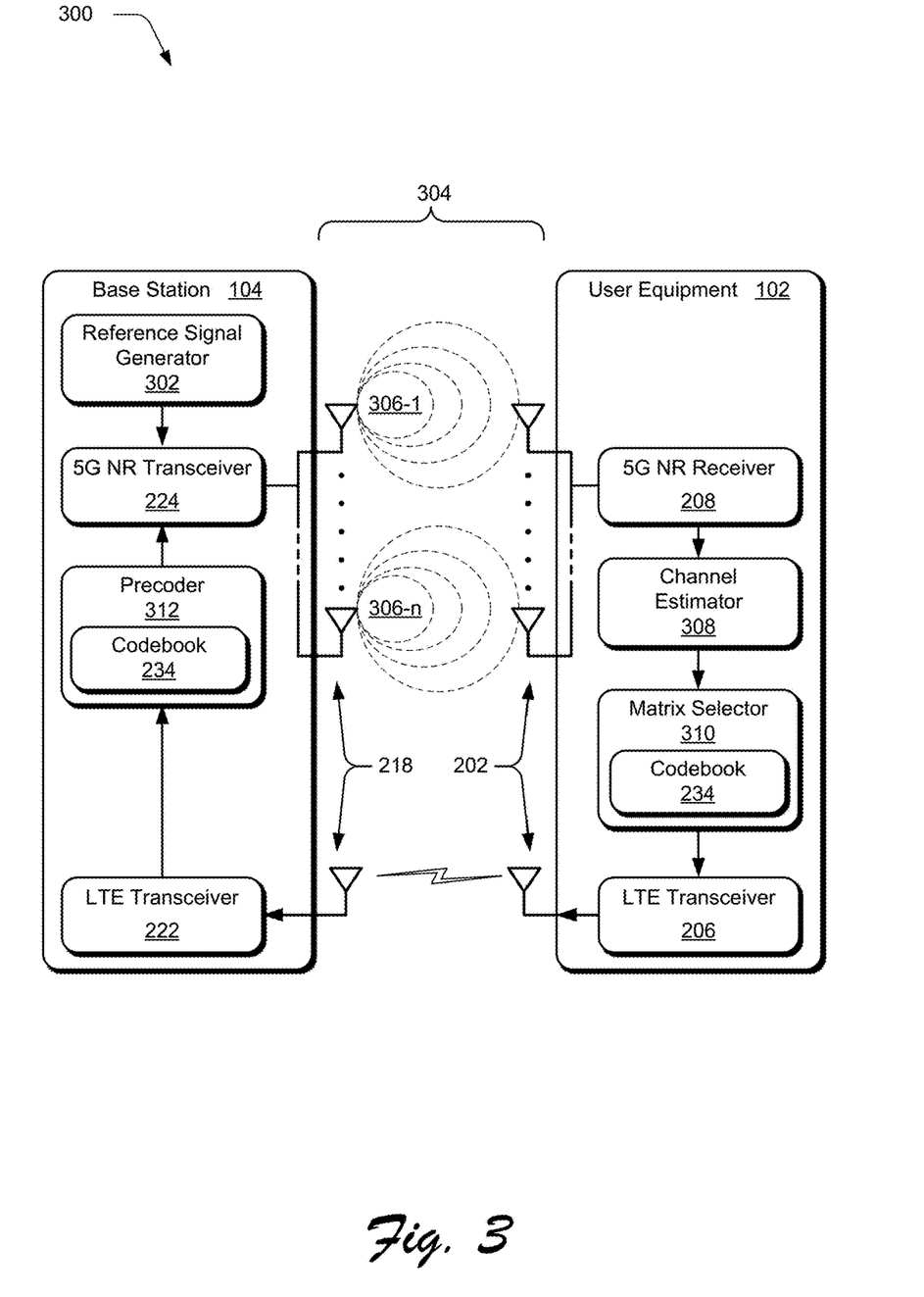
FIG. 3 illustrates an example environment in which various aspects of downlink-only fifth generation new radio techniques can be implemented.

FIG. 3 illustrates an example environment 300 in which various aspects of downlink-only fifth generation new radio techniques can be implemented. The environment 300 illustrates the user equipment 102 providing feedback for beamforming the 5G NR downlink via the wireless link 106.

In aspects, to determine the precoding matrix for beamforming the 5G NR downlink, the base station 104 transmits cell-specific reference signals (RS) distributed over various resource elements (RE) and/or timeslots of the 5G NR downlink. The user equipment 102 evaluates the received reference signals to estimate channel conditions between the base station 104 and the user equipment 102. Based on the channel estimate for each of the received cell-specific reference signals, the user equipment 102 selects a precoding matrix for beamforming the 5G NR downlink transmissions. The user equipment 102 sends a response that includes the PMI of the selected precoding matrix, via the LTE anchor uplink, to the base station 104. The base station 104 uses the selected precoding matrix to beamform the 5G NR downlink to the user equipment. The process of determining the precoding matrix can be repeated periodically based on changes in channel quality, location changes of the user equipment 102, and so forth.

For example, a reference signal generator 302 generates cell-specific reference signals that are provided to the 5G NR transceiver 224 for transmission over an RF channel 304, using the antennas 218. 5G NR downlink signals 306 that are modulated with the cell-specific reference signals are radiated from the antennas 218 (illustrated as 306-1 through 306-n) via the RF channel 304 and are received at the antennas 202 of the user equipment 102. The 5G NR receiver 208 demodulates the received 5G NR downlink signals 306 and provides the demodulated cell-specific reference signals to a channel estimator 308, which generates an estimate of the quality of the RF channel 304 from the received cell-specific reference signals.

Based on the channel estimate for each of the received cell-specific reference signals, a matrix selector 310 determines the best precoding matrix to use for beamforming the 5G NR downlink from the base station 104 to the user equipment 102. The matrix selector 310 includes, or has access to, the codebook 234 and uses the codebook 234 to determine the precoding matrix indicator (PMI) for the best precoding matrix to use for beamforming the 5G NR downlink. The matrix selector 310 provides the PMI to the LTE transceiver 206. The LTE transceiver 206 transmits the PMI to the base station 104 in a message on a control channel, such as a Physical Uplink Control Channel (PUCCH), a Physical Uplink Shared Channel (PUSCH), or the like. The PMI is received by the LTE transceiver 222 in the base station 104 and provided to a precoder 312, which uses the PMI as an index into the codebook 234 to lookup the precoding matrix for beamforming. The precoder 312 uses the precoding matrix from the lookup in the codebook 234 to beamform transmissions of 5G NR downlink by the 5G NR transceiver 224. Additionally and/or optionally, the channel quality indicator (CQI) for the 5G NR downlink can be transmitted by the LTE transceiver 206 along with the PMI.

User Plane and Control Plane Signaling

Figure 4:
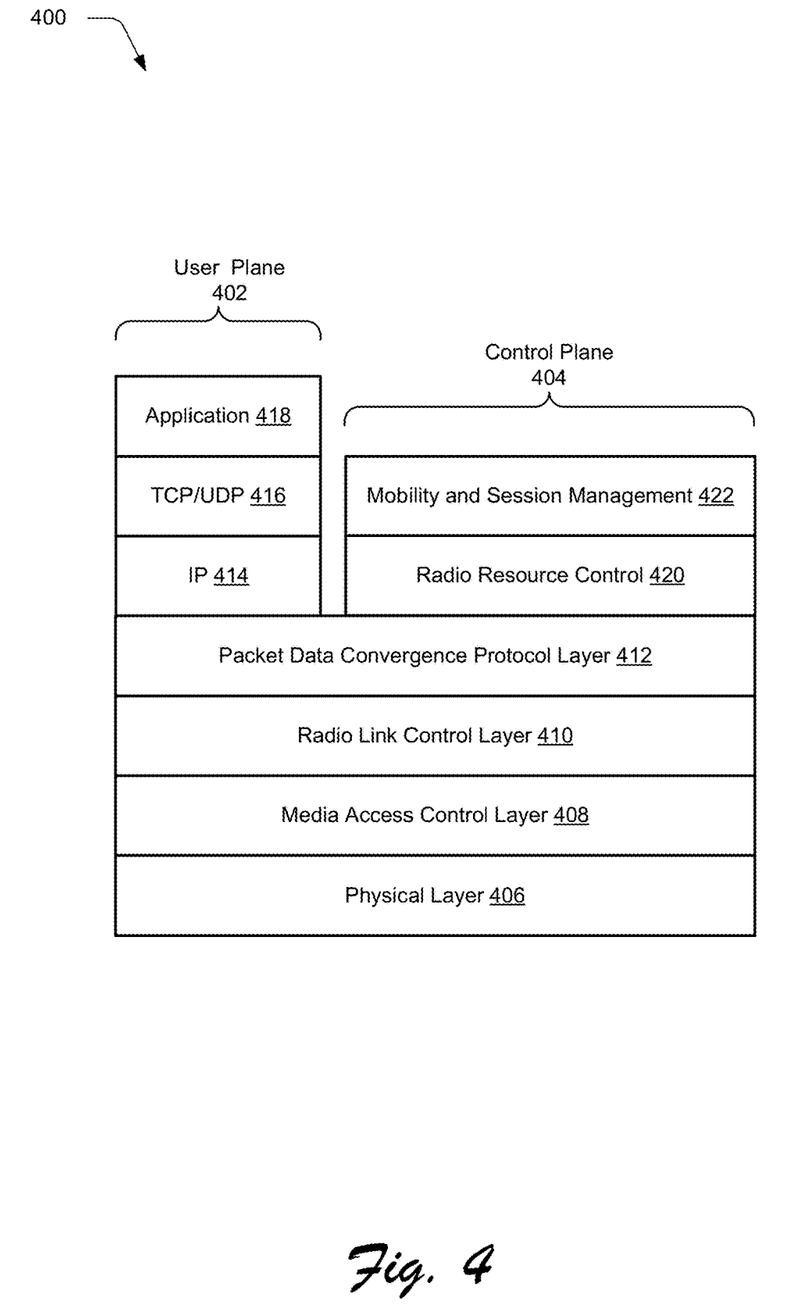
FIG. 4 further illustrates an example network stack model with which various aspects of downlink-only fifth generation new radio techniques can be implemented.

FIG. 4 illustrates an example block diagram of a network stack model 400 that characterizes a communication system for the example environment 100, in which various aspects of downlink-only fifth generation new radio techniques can be implemented. The network stack 400 includes a user plane 402 and a control plane 404. Upper layers of the user plane 402 and the control plane 404, share common lower layers in the network stack 400.

The shared lower layers include a physical layer 406 (PHY layer 406), a Media Access Control layer 408 (MAC layer 408), a Radio Link Control layer 410 (RLC layer 410), and a Packet Data Convergence Protocol layer 412 (PDCP layer 412). The physical layer 406 provides hardware specifications for devices that communicate with each other. As such, the physical layer 406 establishes how devices connect to each other, assists in managing how communication resources are shared between devices, and the like.

The MAC layer 408 specifies how data is transferred between devices. Generally, the MAC layer 408 provides a way in which data packets being transmitted are encoded and decoded into bits as part of a transmission protocol.

The RLC layer 410 provides data transfer services to higher layers in the network stack 400. Generally, the RLC layer 410 provides error correction, packet segmentation and reassembly, and management of data transfers in various modes, such as acknowledged, unacknowledged, transparent modes.

The PDCP layer 412 provides data transfer services to higher layers in the network stack 400. Generally, the PDCP layer 412 provides transfer of user plane 402 and control plane 404 data, header compression, ciphering, and integrity protection.

The user plane 402 layers includes an Internet Protocol layer 414 (IP 414), a Transmission Control Protocol/User Datagram Protocol layer 416 (TCP/UDP 416), and applications 418 that transfer data via the wireless link 106. The IP layer 414 specifies how the data from application 418 are transferred to a destination node. The TCP/UDP layer 416 is used to verify that data packets intended to be transferred to the destination node reached the destination node, using either TCP or UDP for data transfers by the application 418.

The control plane 404 includes Radio Resource Control 420 (RRC 420) and mobility and session management 422. RRC 420 establishes and releases connections and radio bearers, broadcasts system information, performs power control, and so forth. Mobility and session management 422 provides support for mobility management and packet data bearer contexts for the user equipment 102.

In the user equipment 102, each layer in both the user plane 402 and the control plane 404 of the network stack 400 interacts with a corresponding peer layer in the base station 104, the EPC 114, and/or the remote service 118, to support user applications and control operation of the user equipment 102 in the E-UTRAN 112.

In aspects, a 5G NR downlink between the base station 104 and the user equipment 102 is associated with anLTE anchor link that includes a downlink and/or an uplink. For downlink control and/or packet data communications via the 5G NR downlink that require a response to the base station 104 from the user equipment 102, the user equipment 102 transmits the response to the base station 104 via the LTE anchor uplink.

For example, an acknowledgement (ACK) and/or a negative acknowledgement (NACK) at the PHY layer 406 or the MAC layer 408, with respect to operations performed at the PHY layer 406 or the MAC layer 408 for the 5G NR downlink, is transmitted via the PUCCH or the PUSCH on the LTE anchor uplink from the user equipment 102 to the base station 104.

In another example, a 5G NR downlink has a bearer that is separate from LTE bearers between the base station 104 and the user equipment 102. Acknowledgements and control messages in the RLC layer 410 related to the 5G NR bearer downlink are sent to the base station 104 via the LTE anchor uplink.

In a further example, user-plane flow control messages for data transfers over the 5G NR downlink are transmitted via the LTE anchor uplink. For TCP packets transferred via the 5G NR downlink, TCP flow control packets are transmitted via the LTE anchor uplink.

In aspects, signaling for activation and deactivation, communication of grant information, 5G NR downlink measurements, and/or channel quality measurements are communicated between the base station 104 and the user equipment 102 over the LTE anchor link. For example, Radio Resource Control (RRC) messages and/or Media Access Control (MAC) control elements (CE) to activate or deactivate the 5G NR downlink are communicated between the base station 104 and the user equipment 102 over the LTE anchor link that is associated with the 5G NR downlink. In another example, resource elements (RE) that grant time and frequency resources to the user equipment 102 for the 5G NR downlink are transmitted from the base station 104 to the user equipment 102 over the LTE anchor downlink. The base station 104 can also communicate grant information for the LTE anchor link via the 5G NR downlink to the user equipment 102. In further aspects, the base station 104 communicates activation messages, deactivation messages, and/or grant information for the 5G NR downlink over the 5G NR downlink, and/or communicates activation messages, deactivation messages, and/or grant information for the LTE anchor link over the 5G NR downlink.

In aspects, measurement reports for the 5G NR downlink, or measurements of 5G NR signals from other base stations, which are used for radio resource control or mobility management of the user equipment 102, are transmitted to the base station 104 over the LTE anchor uplink. For example, mobility management measurements, such as Received Signal Strength Indicator (RSSI), Reference Signal Received Power (RSRP), and/or Reference Signal Received Quality (RSRQ) measurements related to the 5G NR downlink are transmitted over the LTE anchor uplink from the user equipment 102 to the base station 104. In another example, channel quality measurements used for modulation and coding scheme (MCS) control, such as the channel quality indicator (CQI) for the 5G NR downlink are transmitted to via the PUCCH or PUSCH on the LTE uplink from the user equipment 102 to the base station 104.

Example methods 500-800 is described with reference to FIGS. 5-8 in accordance with one or more aspects of downlink-only fifth generation new radio. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
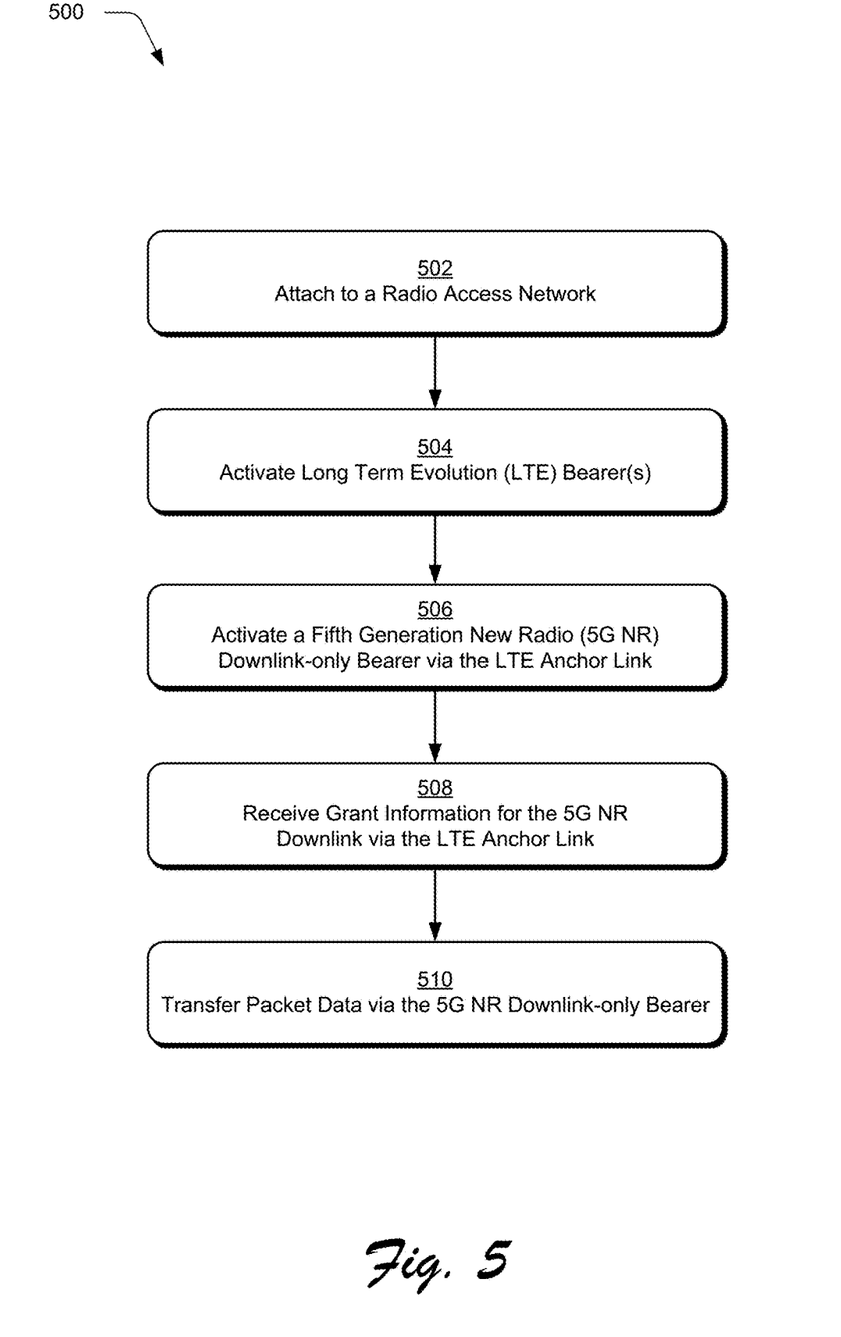
FIG. 5 illustrates an example method of downlink-only fifth generation new radio as generally related to activation of, and data transfer using, an LTE anchor link and a 5G NR downlink in accordance with aspects of the techniques described herein.

FIG. 5 illustrates example method(s) 500 of downlink-only fifth generation new radio as generally related to activation of, and data transfer using, an LTE anchor link and a 5G NR downlink between the user equipment 102 and the base station 104. The order in which the method blocks are described are not intended to be construed as a limitation, and any number of the described method blocks can be combined in any order to implement a method, or an alternate method.

At block 502, a user equipment attaches to a radio access network via a base station. For example, the user equipment 102 attaches to the E-UTRAN 112 via the base station 104. The attachment process may include a random access procedure, establishing a Radio Resource Control (RRC) connection, authenticating the user equipment 102 to the E-UTRAN 112, and/or requesting connectivity to a public data network (PDN).

At block 504, the user equipment activates one or more LTE bearers. For example, the user equipment 102 activates an LTE default bearer with the E-UTRAN 112. The user equipment 102 may additionally activate dedicated bearers with the LTE network.

At block 506, the user equipment activates a 5G NR downlink-only bearer via the LTE anchor link. For example, the user equipment 102 communicates signaling messages via the LTE anchor link to the base station 104 to activate a bearer over the 5G NR downlink. Radio resource control (RRC) messages and/or Media Access Control (MAC) control elements (CE) to activate the 5G NR downlink are communicated between the base station 104 and the user equipment 102 over the LTE anchor link.

At block 508, the user equipment receives grant information for the 5G NR downlink via the LTE anchor link. For example, the user equipment 102 receives resource elements (RE) to configure the 5G NR receiver 208 to use time and frequency resources assigned to the 5G NR downlink.

At block 510, the user equipment transfers packet data via the 5G NR downlink-only bearer and LTE anchor link. For example, the user equipment 102 receives packet data, via the 5G NR receiver 208, over the 5G NR downlink. The user equipment 102 sends acknowledgements of the received packet data using the uplink of the LTE anchor link.

Figure 6:
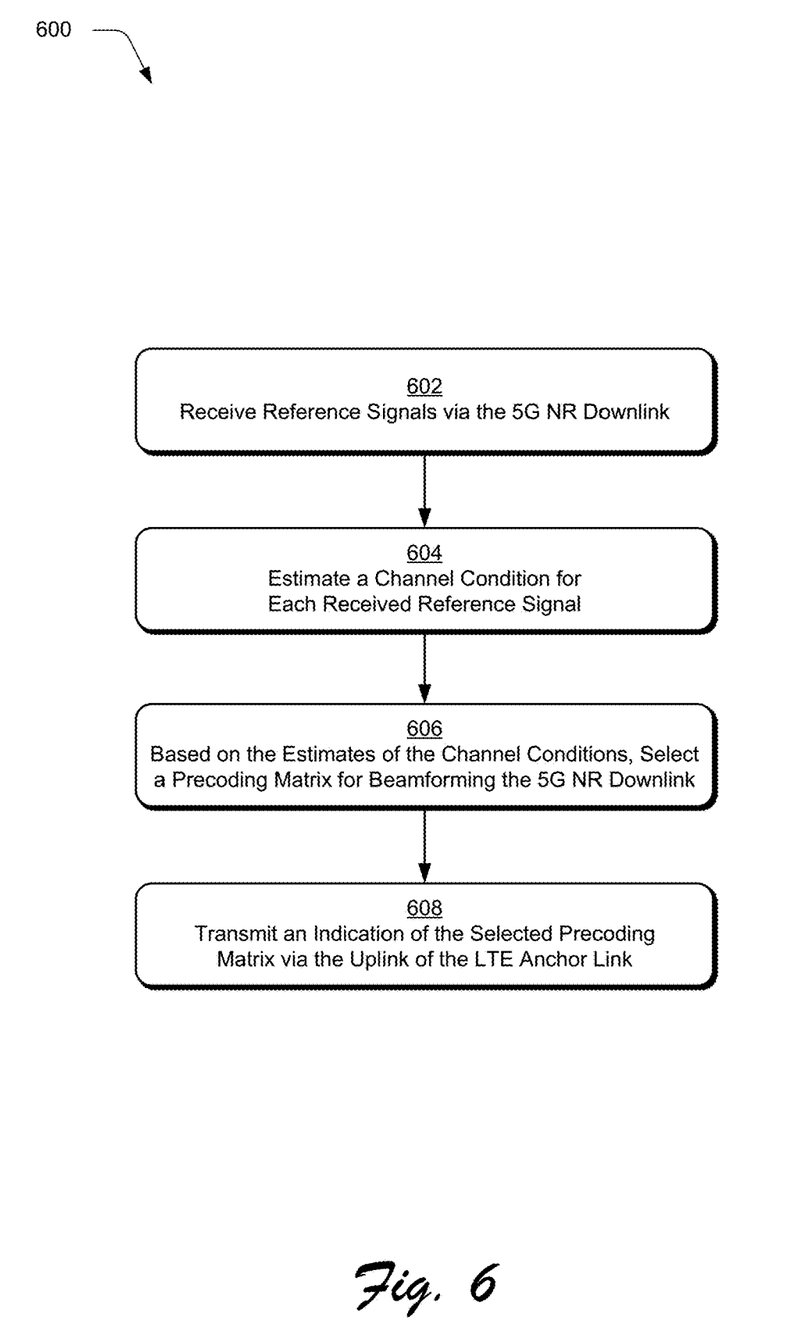
FIG. 6 illustrates an example method of downlink-only fifth generation new radio as generally related to closed-loop beamforming of the 5G NR downlink in accordance with aspects of the techniques described herein.

FIG. 6 illustrates example method(s) 600 of downlink-only fifth generation new radio as generally related to closed-loop beamforming of the 5G NR downlink. The order in which the method blocks are described are not intended to be construed as a limitation, and any number of the described method blocks can be combined in any order to implement a method, or an alternate method.

At block 602, a user equipment receives reference signals via the 5G NR downlink. For example, the user equipment 102 receives cell-specific reference signals (RS) distributed over various resource elements (RE) and/or timeslots of the 5G NR downlink that are transmitted by the base station 104 on the 5G NR downlink.

At block 604, the user equipment estimates a channel condition for each of the received reference signals. For example, the channel estimator 308 in the user equipment 102 estimates a channel condition for each of the reference signals received from the base station 104.

At block 606, based on the estimates of the channel conditions, the user equipment selects a precoding matrix for beamforming the 5G NR downlink. For example, the matrix selector 310 in the user equipment 102 evaluates the estimates of the channel conditions and selects a precoding matrix, from a codebook 234 shared with the base station 104, to beamform the 5G NR downlink.

At block 608, the user equipment transmits an indication of the selected precoding matrix via the uplink of the LTE anchor link to the base station. For example, the user equipment 102 transmits an index, such as a precoding matrix indicator (PMI), associated with the selected precoding matrix in the shared codebook 234, to the base station 104, via the LTE anchor link. The base station 104 uses the selected precoding matrix from the codebook 234 to beamform the 5G NR downlink. The PMI can be transmitted via a Physical Uplink Control Channel (PUCCH) or a Physical Uplink Shard Channel (PUSCH) via the LTE anchor link.

Figure 7:
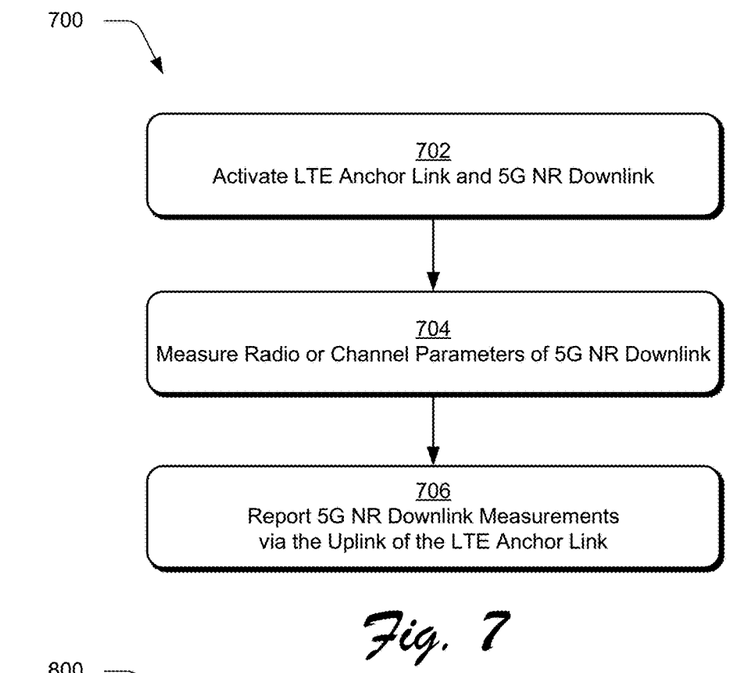
FIG. 7 illustrates an example method of downlink-only fifth generation new radio as generally related to control-plane measurements for mobility management and/or channel quality of the 5G NR downlink in accordance with aspects of the techniques described herein.

FIG. 7 illustrates example method(s) 700 of downlink-only fifth generation new radio as generally related to control-plane measurements for mobility management and/or channel quality of the 5G NR downlink. The order in which the method blocks are described are not intended to be construed as a limitation, and any number of the described method blocks can be combined in any order to implement a method, or an alternate method.

At block 702, a user equipment activates an LTE anchor link and a 5G NR downlink. For example, the user equipment 102 activates an LTE anchor link and a 5G NR downlink from the base station 104, as described with respect to FIG. 5, above.

At block 704, the user equipment measures radio and/or channel parameters of the 5G NR downlink. For example, the user equipment 102 measures mobility management-related radio parameters, such as the RSSI, the RSRP, and/or the RSRQ, and/or channel quality measurements, such as the CQI, related to the 5G NR downlink.

At block 706, the user equipment reports 5G NR downlink measurements via the uplink of the LTE anchor link. For example, the user equipment 102 reports the 5G NR downlink measurements to the base station 104 via the uplink of the LTE anchor link. The 5G NR downlink measurements may be reported separately from similar measurements of the LTE anchor link, or reported in combination with similar measurements of the LTE anchor link.

Figure 8:
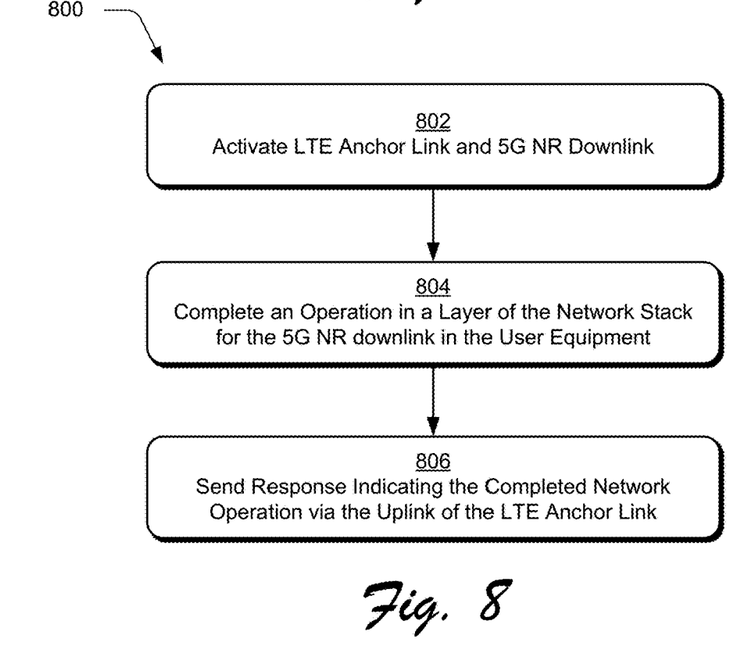
FIG. 8 illustrates an example method of downlink-only fifth generation new radio as generally related to acknowledgements of network layer operations of the 5G NR downlink in accordance with aspects of the techniques described herein.

FIG. 8 illustrates example method(s) 800 of downlink-only fifth generation new radio as generally related to acknowledgements of network layer operations of the 5G NR downlink. The order in which the method blocks are described are not intended to be construed as a limitation, and any number of the described method blocks can be combined in any order to implement a method, or an alternate method.

At block 802, a user equipment activates an LTE anchor link and a 5G NR downlink. For example, the user equipment 102 activates an LTE anchor link and a 5G NR downlink from the base station 104, as described with respect to FIG. 5, above.

At block 804, the user equipment completes an operation in a layer of the network stack for the 5G NR downlink. For example, a network operation in the user equipment 102, which provides a response (e.g., ACK, NACK, handshake, flow control message, and the like) for the completion of the network operation in the 5G NR network stack, completes the network operation and generates the response. The network operation includes PHY and/or MAC operations, TCP operations, application-related operations, and the like.

At block 806, the user equipment sends a response indicating the completion of the network operation via the uplink of the LTE anchor link. For example, the user equipment 102 sends the response that indicates the completion of the network operation in the 5G NR network stack via the uplink of the LTE anchor link.

Figure 9:
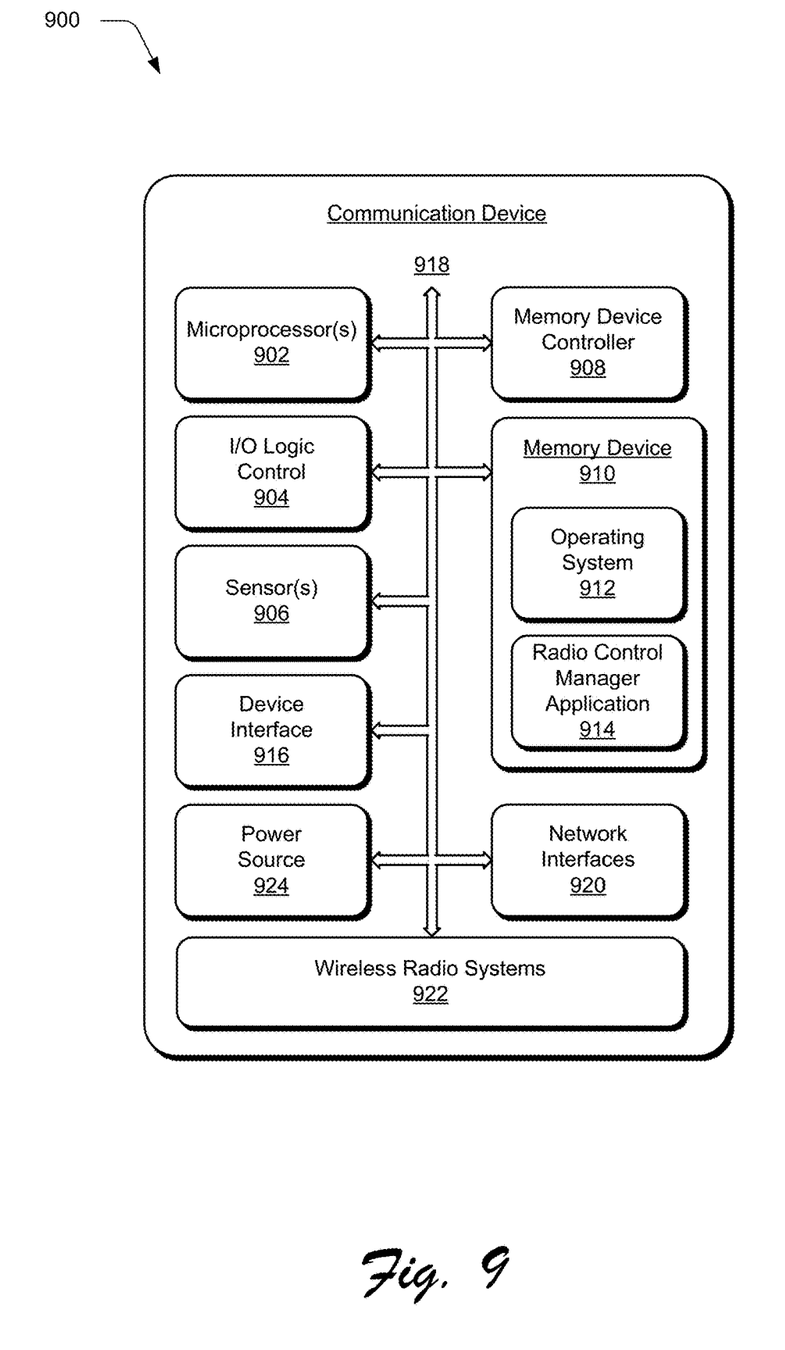
FIG. 9 illustrates an example communication device that can be implemented in a wireless network environment in accordance with one or more aspects of the techniques described herein.

FIG. 9 illustrates an example communication device 900 that can be implemented as the user equipment 102 in accordance with one or more aspects of downlink-only fifth generation new radio as described herein. The example communication device 900 may be any type of mobile communication device, computing device, client device, mobile phone, tablet, communication, entertainment, gaming, media playback, and/or other type of device.

The communication device 900 can be integrated with electronic circuitry, microprocessors, memory, input output (I/O) logic control, communication interfaces and components, as well as other hardware, firmware, and/or software to implement the device. Further, the communication device 900 can be implemented with various components, such as with any number and combination of different components as further described with reference to the user equipment 102 shown in FIGS. 1-3.

In this example, the communication device 900 includes one or more microprocessors 902 (e.g., microcontrollers or digital signal processors) that process executable instructions. The device also includes an input-output (I/O) logic control 904 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits.

The one or more sensors 906 can be implemented to detect various properties such as acceleration, temperature, humidity, supplied power, proximity, external motion, device motion, sound signals, ultrasound signals, light signals, global-positioning-satellite (GPS) signals, radio frequency (RF), other electromagnetic signals or fields, or the like. As such, the sensors 906 may include any one or a combination of temperature sensors, humidity sensors, accelerometers, microphones, optical sensors up to and including cameras (e.g., charged coupled-device or video cameras), active or passive radiation sensors, GPS receivers, and radio frequency identification detectors.

The communication device 900 includes a memory device controller 908 and a memory device 910 (e.g., the computer-readable storage media 212), such as any type of a nonvolatile memory and/or other suitable electronic data storage device. The communication device 900 can also include various firmware and/or software, such as an operating system 912 that is maintained as computer executable instructions by the memory and executed by a microprocessor. The device software may also include a radio control manager application 914 that implements aspects of downlink-only fifth generation new radio. The computer-readable storage media described herein excludes propagating signals.

The communication device 900 also includes a device interface 916 to interface with another device or peripheral component, and includes an integrated data bus 918 that couples the various components of the communication device 900 for data communication between the components. The data bus in the communication device 900 may also be implemented as any one or a combination of different bus structures and/or bus architectures.

The device interface 916 may receive input from a user and/or provide information to the user (e.g., as a user interface), and a received input can be used to determine a setting. The device interface 916 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 916 may also receive inputs from any number of peripherals, such as buttons, a keypad, a switch, a microphone, and an imager (e.g., a camera device).

The communication device 900 can include network interfaces 920, such as a wired and/or wireless interface for communication with other devices via Wireless Local Area Networks (WLANs), wireless Personal Area Networks (PANs), and for network communication, such as via the Internet. The network interfaces 920 may include Wi-Fi, Bluetooth™, BLE, and/or IEEE 802.15.4. The communication device 900 also includes wireless radio systems 922 for wireless communication with cellular and/or mobile broadband networks. Each of the different radio systems can include a radio device, antenna, and chipset that is implemented for a particular wireless communications technology, such as the antennas 202, the RF front end 204, the LTE transceiver 206, and/or the 5G NR receiver 208. The communication device 900 also includes a power source 924, such as a battery and/or to connect the device to line voltage. An AC power source may also be used to charge the battery of the device.

Although aspects of downlink-only fifth generation new radio have been described in language specific to features and/or methods, the subject of the appended claims is not necessarily limited to the specific features or methods described. Rather, the specific features and methods are disclosed as example implementations of downlink-only fifth generation new radio, and other equivalent features and methods are intended to be within the scope of the appended claims. Further, various different aspects are described and it is to be appreciated that each described aspect can be implemented independently or in connection with one or more other described aspects.

What is claimed is:

1. A method of managing a fifth generation new radio (5G NR) downlink from a base station to a user equipment (UE), the method comprising:
    establishing, by the base station, a Long Term Evolution (LTE) anchor link with the UE;
    establishing, by the base station, the fifth generation new radio (5G NR) downlink from the base station to the UE; and
    managing, by the base station, the 5G NR downlink using an uplink of the LTE anchor link.

2. The method of claim 1, wherein the 5G NR downlink from the base station to the user equipment is beamformed, the method comprising:
    transmitting reference signals to the UE that are effective to direct the UE to:
        estimate a channel condition for each of the reference signals; and
        based on the estimate of the channel conditions, select a precoding matrix to use for beamforming the 5G NR downlink by the base station;
    receiving an indication of the selected precoding matrix from the UE using the uplink of the LTE anchor link; and
    beamforming, by the base station, the 5G NR downlink using the precoding matrix selected by the UE.

3. The method of claim 2, wherein the precoding matrix is selected from a codebook, wherein the codebook is shared between the UE and the base station, and wherein the indication of the selected precoding matrix is an index into the codebook usable to access the selected precoding matrix.

4. The method of claim 2, wherein the indication of the selected precoding matrix is a Precoding Matrix Indicator (PMI), the method further comprising:
    receiving, by the base station, the PMI from the UE via a Physical Uplink Control Channel (PUCCH) or a Physical Uplink Shared Channel (PUSCH).

5. The method of claim 1, the managing of the 5G NR downlink comprising:

receiving, by the base station and using the uplink of the LTE anchor link, a measurement report including radio parameters measured by the UE and related to the 5G NR downlink, the radio parameters including one or more of:
a Received Signal Strength Indicator (RSSI),
a Reference Signal Received Power (RSRP), or
a Reference Signal Received Quality (RSRQ).

6. The method of claim 1, the establishing the 5G NR downlink comprising:
transmitting, by the base station, a grant of resource elements (RE) for the 5G NR downlink, the grant of the RE being transmitted to the UE using the LTE anchor link.

7. The method of claim 1, wherein the management of the 5G NR downlink comprises measuring channel quality related to the 5G NR downlink to produce a channel quality indicator (CQI), the method further comprising:
receiving, by the base station, the CQI via a Physical Uplink Control Channel (PUCCH) or a Physical Uplink Shared Channel (PUSCH) using the uplink of the LTE anchor link.

8. The method of claim 7, the receiving the CQI comprising:
receiving, by the base station, a Radio Resource Control (RRC) message from the user equipment using the LTE anchor link.

9. The method of claim 1, the establishing the 5G NR downlink comprising:
granting, by the base station, resource elements (RE) for the 5G NR downlink; and
transmitting, by the base station, the grant of the resource elements for the 5G NR downlink to the user equipment using the LTE anchor link.

10. The method of claim 9, the transmitting the grant of the resource elements comprising:
transmitting, by the base station, a Radio Resource Control (RRC) message, a Media Access Control (MAC) Control Element (CE), or both to the user equipment over the LTE anchor link.

11. The method of claim 1, wherein the management of the 5G NR downlink comprises acknowledging a physical layer operation by the UE, the method further comprising:
receiving, by the base station, the acknowledgement of the physical layer operation from the UE using the uplink of the LTE anchor link.

12. The method of claim 1, wherein the management of the 5G NR downlink comprises acknowledging a Media Access Control (MAC) layer operation by the UE, the method further comprising:
receiving, by the base station, the acknowledgement of the MAC layer operation from the UE using the uplink of the LTE anchor link.

13. The method of claim 1, wherein the management of the 5G NR downlink comprises receiving a flow control message related to user-plane packet data received by the UE, the method further comprising:
receiving, by the base station, the flow control message from the UE using the uplink of the LTE anchor link.

14. The method of claim 1, wherein the management of the 5G NR downlink comprises measuring radio parameters related to the 5G NR downlink, wherein a measurement report includes the measured radio parameters, the method further comprising:
receiving, by the base station, the measurement report from the UE using the uplink of the LTE anchor link.

15. A base station comprising:
a radio frequency (RF) transceiver;
an RF transmitter; and
a processor and memory system to implement a base station manager application configured to:
establish, using the RF transceiver, a Long Term Evolution (LTE) anchor link with a user equipment (UE);
establish, using the RF transmitter, a fifth generation new radio (5G NR) downlink from the base station to the UE; and
manage, by the base station, the 5G NR downlink using an uplink of the LTE anchor link.

16. The base station of claim 15, wherein the 5G NR downlink from the base station to the user equipment is beamformed, and wherein the base station manager application configured to:
transmit reference signals to the UE that are effective to direct the UE to:
estimate a channel condition for each of the reference signals; and
based on the estimate of the channel conditions, select a precoding matrix to use for beamforming the 5G NR downlink by the base station;
receive an indication of the selected precoding matrix from the UE using the uplink of the LTE anchor link; and
beamform, by the base station, the 5G NR downlink using the precoding matrix selected by the UE.

17. The base station of claim 16, wherein the precoding matrix is selected from a codebook, wherein the codebook is shared between the UE and the base station, and wherein the indication of the selected precoding matrix is an index into the codebook usable to access the selected precoding matrix.

18. The base station of claim 16, wherein the indication of the selected precoding matrix is a Precoding Matrix Indicator (PMI), and wherein the base station manager application configured to:
receive, using the RF transceiver, the PMI from the UE via a Physical Uplink Control Channel (PUCCH) or a Physical Uplink Shared Channel (PUSCH).

19. The base station of claim 15, wherein to manage the 5G NR downlink the base station manager application is configured to:
receive, using the RF transceiver and using the uplink of the LTE anchor link, a measurement report including radio parameters measured by the UE and related to the 5G NR downlink, the radio parameters including one or more of:
a Received Signal Strength Indicator (RSSI),
a Reference Signal Received Power (RSRP), or
a Reference Signal Received Quality (RSRQ).

20. The base station of claim 15, wherein to establish the 5G NR downlink the base station manager application is configured to:
transmit, using the RF transceiver and using the LTE anchor link, a grant of resource elements (RE) for the 5G NR downlink to the UE.

21. The base station of claim 15, wherein the management of the 5G NR downlink comprises measuring channel quality related to the 5G NR downlink to produce a channel quality indicator (CQI), and the base station manager application is configured to:
receive, using the RF transceiver and using the LTE anchor link, the CQI via a Physical Uplink Control Channel (PUCCH) or a Physical Uplink Shared Channel (PUSCH).

22. The base station of claim 21, wherein the base station manager application is configured to:

receive, using the RF transceiver and using the LTE anchor link, a Radio Resource Control (RRC) message from the user equipment using the LTE anchor link.

23. The base station of claim 15, wherein to establish the 5G NR downlink the base station manager application is configured to:

grant resource elements (RE) for the 5G NR downlink; and transmit, using the RF transceiver and using the LTE anchor link, the grant of the resource elements for the 5G NR downlink to the user equipment.

24. The base station of claim 23, wherein to transmit the grant of the resource elements the base station manager application is configured to:

transmit, using the RF transceiver and using the LTE anchor link, a Radio Resource Control (RRC) message, a Media Access Control (MAC) Control Element (CE), or both to the user equipment.

25. The base station of claim 15, wherein to management of the 5G NR downlink comprises acknowledging a physical layer operation by the UE, and wherein the base station manager is configured to:

receive, using the RF transceiver and using the uplink of the LTE anchor link, the acknowledgement of the physical layer operation from the UE.

26. The base station of claim 15, wherein the management of the 5G NR downlink comprises acknowledging a Media Access Control (MAC) layer operation by the UE, and wherein the base station manager is configured to:

receive, using the RF transceiver and using the uplink of the LTE anchor link, the acknowledgement of the MAC layer operation from the UE.

27. The base station of claim 15, wherein the management of the 5G NR downlink comprises receiving a flow control message related to user-plane packet data received by the UE, and wherein the base station manager is configured to:

receive, using the RF transceiver and using the uplink of the LTE anchor link, the flow control message from the UE.

28. The base station of claim 15, wherein the management of the 5G NR downlink comprises measuring radio parameters related to the 5G NR downlink, wherein a measurement report includes the measured radio parameters, and wherein the base station manager is configured to:

receive, using the RF transceiver and using the uplink of the LTE anchor link, the measurement report from the UE.

* * * * *